Figure 1:
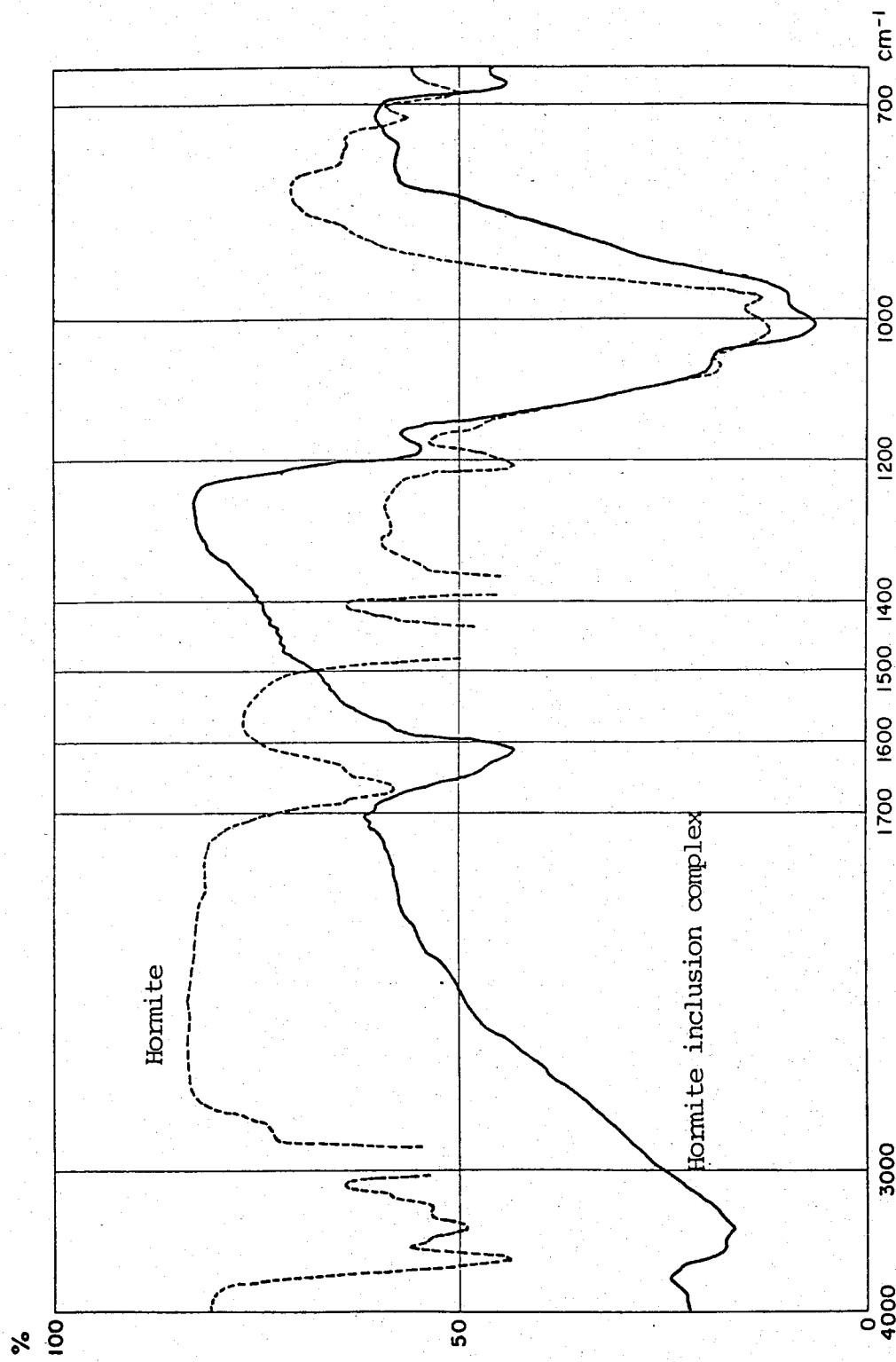

United States Patent [19]

Matsuura et al.

[11] Patent Number: 4,512,962

[45] Date of Patent: Apr. 23, 1985

[54] HORMITE INCLUSION COMPLEX WITH ADSORBED SULPHUR OR SULPHUR DONOR

[75] Inventors: Kazumi Matsuura; Takeo Wada, both of Hyogo, Japan

[73] Assignee: Takeda Chemical Industries, Ltd., Osaka, Japan

[21] Appl. No.: 560,791

[22] Filed: Dec. 13, 1983

[30] Foreign Application Priority Data

Dec. 27, 1982 [JP] Japan .................. 57-230726

[51] Int. Cl.³ .............. C03C 37/07; C08K 5/36; C08K 9/12
[52] U.S. Cl. .................. 423/331; 106/14.33; 106/14.38; 502/62; 502/168; 502/216; 525/348
[58] Field of Search ............. 423/331; 502/62, 168, 502/216

[56] References Cited

U.S. PATENT DOCUMENTS

| | | | |
|---|---|---|---|
| 2,974,117 | 3/1961 | Dunkel et al. | 525/348 |
| 3,714,030 | 1/1973 | Winsor et al. | 208/210 |
| 4,314,980 | 2/1982 | Shen et al. | 423/244 |
| 4,316,813 | 2/1982 | Voss | 252/189 |

FOREIGN PATENT DOCUMENTS 3319251  4/1984  Fed. Rep. of Germany.

OTHER PUBLICATIONS

L. Gonzales Hernandez, et al., Die Angewandte Makromolekulare Chemie, 1982, 104, (No. 1578), pp. 189–201.

Primary Examiner—A. Lionel Clingman
Attorney, Agent, or Firm—Wegner & Bretschneider

[57] ABSTRACT

A hormite inclusion complex which comprises hormite having adsorbed and/or supported thereon at least one member selected from the group consisting of s sulphur and a sulphur-donating agent.

The hormite inclusion complex is for example used in the vulcanization of rubber, there are entirely eliminated the scorching and bloom phenomena which have often been encountered in the utilization of sulphur or sulphur-donating agent alone according to the conventional procedures.

6 Claims, 1 Drawing Figure

HORMITE INCLUSION COMPLEX WITH ADSORBED SULPHUR OR SULPHUR DONOR

The present invention relates to hormite inclusion complexes.

Sulphur has been conventionally used for a long time for vulcanization of diene synthetic rubbers inclusive of natural rubber.

The vulcanization procedure, which comprises mixing raw rubber with sulphur and subjecting the resultant mixture to heat treatment, causes reaction sites in the rubber to undergo three-dimensional crosslinking, with the result that plasticity is decreased and elasticity is increased to produce the so-called vulcanized rubber.

However, there sometimes takes place the so-called scorching phenomenon which involves the enhancement of tackiness of rubber in the initial stage of the vulcanization procedure, thus inducing the rubber to scorch and adhere to rolls. In order to prevent such scorching phenomenon, it has been nearly common practice to add small amounts of antiscorching agents such as salicylic acid, phthalic acid, benzoic acid, picric acid, maleic acid, N-nitrosodiphenylamine, O-phenylenethiourea and cadmium oleate, but addition of such antiscorching agents suffers from the defect that the vulcanization time is prolonged. In addition, when the vulcanization time is prolonged, the temperature of the rubber tends to decrease readily, which brings about the deposition of sulphur in the inside of, and on the surface of the rubber, causing the so-called bloom phenomenon.

The present inventors have been engaged in the research work on hormite for a prolonged period of time, and found that sulphur is easily adsorbed and supported onto hormite, resulting in the formation of an inclusion complex.

Moreover, it was found that when the inclusion complex is used for vulcanization of rubber, the scorching and bloom phenomena as mentioned above are entirely eliminated, and these findings were followed by further repeated research, which has culminated in the present invention.

Thus, the present invention is directed to hormite inclusion complexes which comprise hormite having adsorbed and/or supported thereon at least one member selected from the group consisting of a sulphur and a sulphur-donating agent.

The hormite, which is useful in the present invention, is a general term for fibrous clay minerals having a large number of active hydroxyl groups on the surface, and is normally referred to as "mountain leather", "mountain cork", "mountain wood", etc., which include sepiolite, a kind of hydrated magnesium.silicate, attapulgite, a kind of hydrated magnesium.alumina.silicate, and palygorskite. Magnesium.trisilicate as an antacid is also a kind of hormite. The hormite may assume any form and shape such as powder, crushed pieces, pellets and spheres.

In addition to the above kinds of hormite, in the present invention, combined use may be made of wallastonite based fibrous-shaped calcium silicates such as nekoite, okenite, xonotlite, faujasite and hillebrandite.

The above-mentioned hormite, in advance, may be ion-exchanged with Na, Zn, K, Ca, Sb, Sn, Fe, Co, Ni and others, or admixed with oxides or hydroxides such as MgO, CaO, $Co_2O_3$, $MnO_2$, ZnO and $Mg_2(OH)_2CO_3$. In the case of the use of molded hormite, furthermore, it is entirely justifiable to use hormite moldings containing as a binding agent salts such as alumina sol, silica sol, aluminum phosphate sol, titanic acid sol and zirconia sol. Even when the hormite is molded after the addition of materials being eventually transformable into a resin form such as furfuryl alcohol, benzyl alcohol, creosote oil, styrene, vinylpyridine and phenol resin, it causes no inconvenience.

In order to facilitate the adsorption and/or supporting with a sulphur and/or sulphur-donating agent as described below readily and for a shortened period of time, the hormite may be subjected to surface treatment. This procedure of surface treatment may be carried out by soaking hormite in advance in furfuryl alcohol, benzyl alcohol, creosote oil, etc., and heating to provide the surface of the hormite with a resin-like covering, followed by heating further said resin-like covering to produce a carbonized surface. Such covered hormite may be further heated to allow its surface to carbonize. The resulting carbonization product can adsorb and support the sulphur and/or sulphur-donating agent at lowered temperatures and for a shortened period of time. The hormite having its surface water-repellent treated with cationic surfactants, silicones, organic titanium compounds, stearic acid or its salts can also adsorb and support the sulphur and/or sulphur-donating agent quickly.

Examples of the sulphur employable in the present invention include sulphur, such as powdered sulphur, insoluble sulphur and colloidal sulphur, and sulphur chloride. Examples of the sulphur-donating agent include those, such as amine or metal salts of dithiocarbamic acid (e.g. piperidine pentamethylenedithiocarbamate, pipecoline pipecolydithiocarbamate, diethyl diethyldithiocarbamate ammonium, cyclohexylethyl cyclohexylethyldithiocarbamate ammonium, sodium cyclohexylethyldithiocarbamate, sodium dibutyldithiocarbamate, zinc dimethyldithiocarbamate, zinc diethyldithiocarbamate, zinc dibutyldithiocarbamate, zinc ethylphenyldithiocarbamate, zinc pentamethylenedithiocarbamate, etc.), xanthates (e.g., sodium isopropylxanthate, zinc isopropylxanthate, zinc butylxanthate, etc.), thiuram monosulfides (e.g., tetramethylthiuram monosulfide, etc.), thiuram disulfides (e.g., tetramethylthiuram disulfide, tetraethylthiuram disulfide, dimethyldiphenylthiuram disulfide, dipentamethylenethiuram disulfide, dipentamethylenethiuram tetrasulfide, etc.), thiazoles (e.g., mercaptobenzothiazole, its zinc and cyclohexylamine salts, dibenzothiazole disulfide, dinitrophenyl thioether of mercaptobenzothiazole, etc.), sulfenamides (e.g., cyclohexylbenzothiazylsulfenamide, dicyclohexylbenzothiazylsulfenamide, oxydiethylenebenzothiazylsulfenamide, butylbenzothiazylsulfenamide, dipropylbenzothiazylsulfenamide, etc.), aldehydeamines (e.g., butylaldehydeaniline, acetaldehydeammonia, hexamethylenetetramine, formaldehydetoluidine, etc.), guanidines (e.g., diphenylguanidine, di-o-tolylguanidine, o-tolylbiguanide, etc.), amines (e.g., polyethyleneamine, cyclohexylethylamine, dibutylamine, etc.), thioureas (e.g., thiocarbanilide, ethylenethiourea, diethylthiourea, trimethylthiourea, etc.), and so forth. Out of the above, particularly, thiuram disulfides, thiazoles and guanidines are preferable. The above sulphur and sulphur-donating agent may be used as mixtures of not less than two kinds.

The amount of the sulphur and/or sulphur donating agent is preferably in the range of ca. 1 to 75 weight % against hormite, particularly ca. 3 to 48 weight %. The maximum amount of the sulphur and/or sulphur donating agent to be adsorbed in the inside of hormite is in the neighborhood of ca. 50 weight %, whereby such sulphur and/or sulphur donating agent in excess of the said amount stands in the form of being supported onto hormite. In the present invention, the sulphur and/or sulphur donating agent may either be adsorbed or supported onto hormite. Or they may be simultaneously adsorbed and supported.

As the procedure of allowing hormite to adsorb and/or support a sulphur and/or sulphur donating agent, for example, there may be mentioned the following:

(1) A procedure which comprises dissolving a sulphur in an organic solvent such as carbon disulfide, alcohols (particularly, benzyl alcohol), benzene and ether, adding hormite to the solution and evaporating the solvent. In this case, heating at a temperature of not higher than 444° C. may be effected to stabilize the sulphur.

(2) A procedure which comprises placing hormite in a suspension of a sulphur in water, mixing them uniformly and evaporating water, followed by heating at a temperature of ca. 80° C. to not higher than 350° C. to achieve stabilization.

(3) A procedure which comprises mixing a sulphur with hormite, adding suitably water or an organic solvent to the mixture to knead thoroughly, forming the resulting mixture by extrusion and heating the formed material at ca. 80° to 350° C.

(4) A procedure which comprises placing a sulphur and hormite in a closed system, separately, heating only the portion containing the sulphur at now lower than ca. 444° C. to evaporate the sulphur, while, on the other hand, heating the hormite at a temperature in the neighborhood of ca. 350° C., and introducing vapors of the sulphur to the heated hormite.

(5) A procedure which comprises placing hormite in an aqueous solution of sodium thiosulfate, and adding concentrated sulfuric acid dropwise to the mixture at ca. 0° to 100° C., preferably not more than room temperature to allow the sulphur to crystallize out in the inside of hormite.

(6) A procedure which comprises contacting hormite heated at a temperature of about 80° to 180° C. with a mixed gas of $H_2S$ and oxygen or air in a glass column to have the mixed gas adsorbed on the hormite.

(7) A procedure which comprises contacting hormite heated at a temperature of about 80° to 180° C. with a mixed gas of $H_2S$ and $SO_2$ in a glass column to have the mixed gas adsorbed on the hormite.

(8) A procedure which comprises mixing a sulphur-donating agent with hormite, followed by heating the mixture at a temperature of ca. 80° C. to not higher than 350° C.

(9) A procedure which comprises dissolving a sulphur-donating agent in an organic solvent such as carbon disulfide, alcohols, benzene and ether, adding hormite to the solution and evaporating the solvent.

The above procedures 1 through 9 may be carried out in the air or in an inert gas such as nitrogen gas. Also, they may be carried out in a liquid or resin which withstands the heating conditions. The liquid may be exemplified by ethylene glycol.

As a means of stabilizing the sulphur and/or sulphur-donating agent adsorbed and/or supported onto hormite, not much more than ca. 10 weight % against the sulphur and/or sulphur-donating agent of halogens, phosphine, arsenic, antimony, chlorides such as titanium chloride, phosphorus pentoxide, chlorides of tin, antimony chlorides, zirconyl chloride and mercuric bichloride, ammonium halides such as ammonium chloride, ammonium dimethyl chloride, benzylmethylammonium chloride, ammonium bromide and ammonium iodide, salts of chlorine and hypohalogenous acid such as potassium chloride and iodine chlorides, and so forth may be added in conjunction with the sulphur and/or sulphur-donating agent, or the above-described compounds may be further added to the hormite on which sulphur and/or sulphur-donating agent have been adsorbed in advance. In the case of the use of the above-mentioned compounds, the sulphur and/or sulphur-donating agent adsorbed and/or supported onto hormite in many instances have their terminals chlorinated, brominated, iodinated, oxyhalogenated, phosphinated or aminated. Furthermore, a very small amount of a liquid such as ethylene glycol or machine oil may be added to render the surface of the hormite inclusion complex wet.

The X-ray diffraction pattern of the hormite inclusion complexes thus obtained demonstrates the X-ray powder pattern to be comparable to the one with hormite alone. In cases in which a sulphur and/or sulphur-donating agent are supported onto hormite but not adsorbed, such hormite inclusion complex provides an X-ray diffraction pattern showing the mixed pattern of the X-ray diffraction patterns obtained with the sulphur and/or sulphur-donating agent and hormite, respectively.

The infrared spectrum of the hormite inclusion complexes of the present invention is shown as FIG. 1.

The hormite inclusion complex according to the present invention can be used for example in the vulcanization of rubber. In such a case, the inclusion complex of the present invention is compounded as such into rubber, followed by subjecting to heat treatment, whereby the sulphur and/or sulphur-donating agent adsorbed and/or supported in the inside of the hormite are gradually released, thus permitting the vulcanization of rubber. The hormite, after having released the entire sulphur and/or sulphur-donating agent, develops the reinforcing effect for rubber being equal or superior to that of white carbon. The kind of rubber may be of any family of rubbers, which include for example natural rubber and synthetic rubbers such as diene rubbers exemplified by butadiene-styrene and butadiene-acrylonitrile rubbers, polysulfide rubbers typified by thiocol, olefin rubbers exemplified by ethylene-propylene rubbers and chlorosulfonated polyethylene, organosilicon-compound based rubbers, fluorine-containing compound based rubbers, urethane rubbers and vinylic rubbers.

The proportion in which the hormite inclusion complex of the present invention is used is in the range of ca. 0.1 to 10 weight % against rubber, particularly ca. 1 to 7 weight %.

When the inclusion complex of the present invention is for example used in vulcanization of rubber, there are entirely eliminated the scorching and bloom phenomena which have often been encountered in the utilization of sulphur or sulphur-donating agent alone according to the conventional procedures. Therefore, the inclusion complex allows its addition ratio against rubber to be increased to a higher level than in the case of the conventional methods, and is particularly suited as a filler for high-load tyres such as those for bulldozers and aircraft.

The examples are described in the following to illustrate the present invention more specifically.

EXAMPLE 1

In 100 gr of carbon disulfide is dissolved 42 gr of powdered sulphur. After the sulphur is completely dissolved, 100 gr or granular sepiolite is added to the solution, and the mixture is made uniform and homogeneous, whereby the carbon disulfide is adsorbed to such an extent that it is hardly detected. The solid material is freed of the carbon disulfide under reduced pressure and placed in a dryer at 120° C. to dry for about 1 hour. X-ray powder diffraction of the product provided the diffraction pattern of sepiolite alone.

A thermobalance analysis under a stream of nitrogen indicated that the sulphur component can be vaporized and removed at 400° C.

Subsequently, 42 gr of powdered sulphur is dissolved in 100 gr of carbon disulfide, and the product adsorbed with sulphur as prepared previously is placed again in the solution, followed by removal through evaporation of the carbon disulfide at room temperature to produce needles of sulphur alone from the surface of sepiolite. Microscopic examination of the separated sulphur component revealed that the sulphur occurs all in monoclinic needle-shaped crystals but not in prism-shaped, bipyramidal rhombic crystals.

Normally, crystallization of sulphur from its saturated carbon disulfide solution yields rhombic crystals, but it may be concluded from the above observation that sepiolite imposes structural restraints on sulphur.

EXAMPLE 2

Weighed out are 100 gr of powdered sulphur and 100 gr of the same sepiolite as used in Example 1, which are mixed thoroughly and made uniform in a mortar to produce a bulky mixture. The mixture is light-yellow colored, and X-ray powder diffraction of the mixture as such revealed the mixed pattern of the X-ray powder diffraction patterns obtained with sepiolite and rhombic crystals of sulphur. The mixture, upon heating in a covered crucible at 150° C. for ca. 3 hours and cooling to room temperature, turns into a slightly sulphur-smelling, milky powder. X-ray powder diffraction showed the altered diffraction pattern of sepiolite alone. The powder, when immersed in water, repels water, and exhibits only 0.20 ml/g of accumulated pore volume as determined by introducing a nitrogen gas.

The powder, upon washing with liquid carbon disulfide, changed slightly from transparent to yellow, but did not eluted in large quantities.

After being filtered out from the carbon disulfide, the powder was dried and measured by a thermobalance in a nitrogen gas, resulting in evaporation of sulphur gas at 400° C. It can be seen from this that insoluble sulphur is contained in the material adsorbed with sulphur, because sulphur solely shows a λ type of change at 444° C.

EXAMPLE 3

Weighed out are 100 gr of the same sepiolite powder as in Example 1, 5 gr of zirconyl chloride, 100 gr of powdered sulphur, 130 gr of water and 5 gr of ethyl cellulose, which are mixed in a table type mixer to a uniform mixture. The mixture is extruded through a mouth piece of 1 mm in diameter by a soil kneader and dried to produce pellets. The pellet, when powdered, showed the mixed pattern of the X-ray powder diffraction patterns obtained with sepiolite and rhombic form sulphur. The pellet, when placed in a tightly closed vessel, heated at 160° C. for about 1 hour and then cooled, demonstrated the X-ray diffraction pattern of sepiolite alone. Upon washing with carbon disulfide, the pellet remained transparent and white, with no sulphur eluted.

EXAMPLE 4

Weighed out are 100 gr of sepiolite, 100 gr of powdered sulphur and 2 gr of ammonium iodide, which are mixed thoroughly in a mortar, followed by placing in a covered vessel and heating at 160° C. for about 1 hour. When the vessel is opened, there evolves a purple-colored gas which is supposed to be an iodine gas, with no smell of ammonia emitted. After being cooled, the powder turns light-brown, and X-ray powder diffraction of it reveals the pattern of sepiolite, with no pattern of sulphur and ammonium iodide demonstrated. The powder, upon washing with carbon disulfide, turned brown, while it remains light-brown after being filtered and dried.

The powdered product was compounded into natural rubber according to the following formulation, followed by vulcanization to yield a vulcanizate.
Natural rubber: 100 parts by wt.
Sepiolite inclusion complex: 5.12 parts by wt.
Zinc white: 5 parts by wt.
White lead: 70 parts by wt.
Calcium carbonate: 24.5 parts by wt.
Vulcanization accelerator: 0.8 parts by wt.
Stearic acid: 1 parts by wt.
Paraffin: 2 parts by wt.
Carbon black: 10 parts by wt.
Vulcanization conditions: 143° C.×20 min.

The above formulation without any vulcanization accelerator also permitted vulcanization, with the resulting vulcanizate having almost the same appearance as the above-mentioned one.

EXAMPLE 5

To 50 gr of the same sepiolite as used in Example 1 was added 7.6 gr of carbon disulfide, followed by stirring to a uniform mixture. Separately, a solution of 9 gr of dimethylamine in 30 ml of ethyl alcohol was prepared, and added to the sepiolite containing carbon disulfide, followed by stirring to a uniform mixture. By gradually heating up to about 50° C., the mixture was freed of the ethyl alcohol, thereby forming a dry powdered sepiolite. X-ray powder diffraction revealed the pattern peculiar to sepiolite.

When about 1 gr of the powdered product was taken and put on the thermobalance to investigate the mode of loss in weight, it turned out that

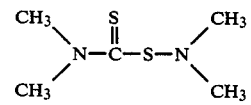

was liberated at 190° C.

40 gr of powdered sulphur was added to 60 gr of sepiolite containing the remainder of dimethylammonium dithiocarbamate, and they were stirred to a uniform mixture, followed by placing in a covered vessel and heating at 150° C. to dry. After cooling and when the vessel was opened, it was found that the mixture was deprived of a yellow color owing to sulphur and turned white like sepiolite. X-ray powder diffraction showed the pattern peculiar to sepiolite but not the one of sulphur.

When 1 gr of the powder was taken and put on the thermobalance in a stream of nitrogen, there were observed great losses in weight at temperatures in the neighborhood of 230° C. and 400° C. The loss in weight at a temperature in the neighborhood of 400° C. is thought to be attributed to sulphur, as evidenced by the formation of sulphur powder in a trap of the exhaust system.

Chemical analysis on the water trap indicated that the loss in weight at a temperature in the neighborhood of 230° C. is due to a mixture of the vulcanization accelerators,

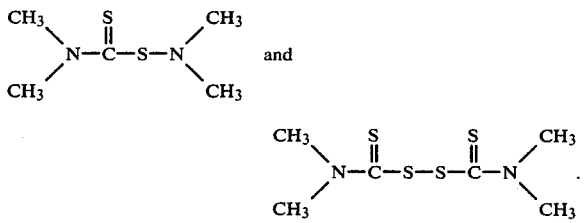

and

EXAMPLE 6

Weighed out is 100 gr of the same sepiolite as used in Example 1, which is then sprayed uniformly with 20 gr of $HSCH_2CH_2CH_2Si(OCH_3)_3$ to effect the silane treatment, followed by drying at 100° C. for about 1 hour.

100 gr of sulphur is added to it, and stirring is carried out by hand to a uniform mixture. The mixture is transferred to a covered dish made of aluminum, which is then placed in a dryer at 150° C. and left standing there for about 1 hour. X-ray powder diffraction demonstrated the pattern peculiar to sepiolite but not the pattern of sulphur.

2 gr of stearic acid is added to 100 gr of sepiolite, which, after a small amount of water is added, are stirred in a mortar to a uniform mixture. The resultant powder, when freed of the water, becomes water-repellent. The powder and 50 gr of sulphur are placed in a covered dish made of aluminum and mixed slightly. The resulting mixture, upon standing in a dryer at 160° C. for 30 minutes, is deprived of a yellow color owing to sulphur and shows an X-ray pattern peculiar to sepiolite.

1 gr of octadecylbenzylmethyl ammonium chloride, 80 gr of powdered sulphur and 50 gr of water are mixed with 100 gr of sepiolite in a mortar to a uniform mixture. The mixture is transferred to a dish made of aluminum, which is placed in a dryer at 100° C. to effect drying for 1 hour, then covered and left on standing for about 1 hour in the dryer at the temperature raised to 150° C. After cooling, the powder is shown to be deprived of a yellow color and demonstrates an X-ray powder diffraction pattern peculiar to sepiolite.

A 1-gr sample each of the above three products are placed in a reagent bottle of a 50 ml capacity, respectively, each of which is filled with 20 ml of carbon disulfide, then covered, shaken thoroughly and allowed to stand for 2 days. Each carbon disulfide remains colorless and transparent, and contains no carbon disulfide eluted.

A 1-gr sample each of the above three products are placed in a reagent bottle of a 50 ml capacity, respectively, each of which is filled with 20 ml of distilled water and shaken thoroughly. The samples are water-repellent and remain floating on the surface of water.

Furthermore, a 1-gr sample each of the above three products are placed in a reagent bottle of a 50 ml capacity, respectively, each of which is treated with 20 ml of styrene and shaken thoroughly. The samples are dispersed uniformly in styrene.

EXAMPLE 7

A 1000 gr portion of sepiolite is mixed with 1050 ml of water and 30 gr of methylcellulose in a table mixer for about 1 hour to a uniform mixture, followed by forming pellets of 1 mm in diameter with the use of the same extruder as employed in Example 3. After drying is conducted, 300 gr of the pellets are placed in a furnace at 500° C. and burnt for about 3 hours, with the result that the surface of the pellets turns gray. When 1 gr of the pellets is weighed out and subjected to measurement of the pore density by the mercury intrusion method, the pellets are found to show the pore density of 0.83 ml/g.

About 80 cc of powdered sulphur is filled into a glass bottle of a 100 ml capacity, and 20 gr of the above burnt pellets after being slightly moistened is buried. The bottle is closed loosely, placed in a dryer at 160° C. and left on standing in it for about 2 hours. After being cooled, the pellets alone are taken out, while removing the powdered sulphur around them. The pellets remain gray, with a yellow color owing to powdered sulphur slightly remained on the surface. After the pellets are washed with carbon disulfide and freed of the carbon disulfide by evaporation, they are found to weigh 38 gr.

1.5 gr of the pellets is taken, and put on the thermobalnce, whereby there is observed a loss in weight at 400° C. through gasification of sulphur, with the loss in weight of 47.32 weight %.

EXAMPLE 8

To 1000 gr of the sepiolite as used in Example 1 are added 20 gr of creosote oil and 350 ml of water, and they are mixed to a uniform mixture. The mixture is freed of the water, heated at 550° C. by the use of an electric furnace and left on standing at 550° C. for 1 hour, thereby yielding black granules like activated carbon in the total weight of 960 gr. 500 gr of the black granules is taken, and 400 gr of powdered sulphur is added, followed by mixing to a uniform mixture. The mixture is placed in a dryer at 180° C. and left on standing in it for 2 hours, whereby the whole amount of the sulphur is adsorbed and the granules change into black-gray granules.

After the granules are finely divided by an atomizer, 2-gr quantities are sampled from 5 different parts and burnt at 500° C. The measurements of loss in weight are 43.8 weight %, 44.0 weight %, 44.2 weight %, 43.8 weight % and 44.6 weight %, with the average of 44.1 weight %, which suggests that the granules have adsorbed almost evenly sulphur. On the other hand, 1 gr is taken from one of these samples and dispersed in 20 ml of carbon disulfide and there is no elution of sulphur observed.

EXAMPLE 9

A glass column of 3 cm in inner diameter is filled with 100 gr of granular sepiolite as used in Example 1 and then with about 50 ml of alumina beads.

The alumina layer of the column is heated to 180° C. and the sepiolite layer is heated to 130° C.

From the upper part of the column, mixed gas of $H_2S$ and air in volume ratio of 98 to 2 is passed through at a velocity of about 1 l per minute while at the lower part of the column, the leaked $H_2S$ gas is detected.

After about 50 hours, the amount of the leaked $H_2S$ gas increases.

The passing of the mixed gas is stopped after 56 hours.

The sepiolite layer is taken out of the column and cooled.

The amount of the layer was 167 gr. X-ray powder diffraction of the product provided the diffraction pattern of sepiolite alone.

The analysis of the product by an autoanalyzer of sulphur revealed that 0.76 gr of sulphur is contained against 1 gr of sepiolite.

EXAMPLE 10

A glass column of 3 cm in inner diameter is filled with a mixture of 50 gr of granular sepiolite as used in Example 1 and 50 gr of attapulgite and then with about 50 ml of granular alumina.

The alumina layer of the column is heated to 180° C. and the mixed layer of sepiolite and attapulgite is heated to 130° C.

From the upper part of the column, mixed gas of $H_2S$ and $SO_2$ in volume ratio of 2 to 1 is passed through at a velocity of about 200 ml per minute while at the lower part of the column, the leaked $H_2S$ or $SO_2$ gas is detected.

After about 7 hours, the amount of the leaked $H_2S$ gas increases rapidly than that of the leaked $SO_2$ gas.

The passing of the mixed gas is stopped.

The mixed layer of sepiolite and attapulgite is taken out of the glass tube and cooled.

The amount of the layer was 165 gr.

X-ray powder diffraction of the product provided the diffraction pattern of the mixture of sepiolite and attapulgite.

The analysis of the product by an autoanalyzer of sulphur revealed that 0.73 gr of sulphur is contained against 1 gr of the mixture of sepiolite and attapulgite.

What is claimed is:

1. A hormite inclusion complex which comprises hormite having adsorbed and/or supported thereon at least one member selected from the group consisting of sulphur and a sulphur-donating agent.

2. A hormite inclusion complex claimed in claim 1, wherein the amount of the sulphur and/or sulphur-donating agent is in the range of about 1 to 75 weight % on the basis of hormite.

3. A hormite inclusion complex claimed in claim 1, wherein the amount of the sulphur and/or sulphur-donating agent is in the range of about 3 to 48 weight % on the basis of hormite.

4. A hormite inclusion complex claimed in claim 1, wherein the hormite is sepiolite.

5. A hormite inclusion complex claimed in claim 1, wherein the hormite is a mixture of sepiolite and attapulgite.

6. A hormite inclusion complex claimed in claim 1, wherein the sulphur is powdered sulphur.

* * * * *